3,310,495
PROCESS FOR POLISHING GLASS
Masaharu Masuda, Amagasaki, Hideo Kita, Tukaguchi, Amagasaki, Yoshio Okada, Nishinomiya, and Ryuzo Fujita, Amagasaki, Japan, assignors to Nippon Sheet Glass Co., Ltd., Osaka, Japan
Filed July 9, 1965, Ser. No. 473,904
Claims priority, application Japan, Sept. 9, 1961, 36/33,032
3 Claims. (Cl. 252—79.1)

This is a continuation-in-part application of our copending application, Ser. No. 220,248, filed August 29, 1962, now abandoned.

This invention relates to the art of polishing glass and primarily to a novel method for polishing ground plate glass.

In the plate glass industry, the polishing operation still constitutes an expensive and time-consuming step. Where an abrasive is used, such as rouge, that is iron oxide, the mechanical work spent and the time involved are all out of proportion to the small amount of glass which is removed.

Hydrofluoric acid has also been extensively used for the purpose of removing surface imperfections and blemishes from glass articles and providing a smooth surface. Several disadvantages, however, accompany the use of hydrofluoric acid, namely the glass is attacked in sections which were supposed to remain free from the action of the acid, and unsightly streaks are frequently found, which lower the value of the finished article. Further, the polishing solution must contain a fairly high concentration of highly corrosive hydrofluoric acid, which necessitates many precautionary measures.

It has also been suggested to use a two-step process, mainly coarse abrasives in the first step, such as sand, and fine abrasives such as iron oxide in the second step, in conjunction with a solution which attacks the glass by chemical reactions. One of the main difficulties of this process resides in the selection of a solution which is effective in each case, with the particular type of glass involved. Another difficulty is that the products from the chemical reaction of the polishing solution with the glass, are soluble in the solution, and are carried away from the glass surface. The result is that uncontrolled and undue corrosion of the plate glass occurs, with pits being formed in the undersurface layer, because no protection is provided even at the sites where no chemical attack is needed. For instance, Junge in U.S. Patent 2,936,554 claims a process which utilizes a concentrated aqueous solution of hydrofluoric acid and ammonium bifluoride, flushing with water and in a second step, rubbing in the presence of an abrasive. The preferred solution according to this process, is essentially saturated, because it contains 150 parts of hydrofluoric acid (HF), 375 parts of ammonium bifluoride, that is an acidic fluoride ($NH_4HF_2$) in 100 parts of water. This solution contains 24% of hydrofluoric acid and 60% of ammonium bifluoride. In addition to the high cost involved, this highly corrosive solution drills the undersurface of the plate glass, and causes small holes which make the glass not usable for many critical applications, for instance, mirrors.

It has also been suggested to add to the polishing compositions some substances which increase the surface tension and viscosity of the solution. Among the additives, phosphoric acid, sugar and polymeric materials have been used. The main disadvantages with these processes, however, is that the increase in surface tension and viscosity causes the reaction products to form such a thick sludge upon the glass surface, that the polishing solution becomes pasty and must be replaced frequently during operation.

One object of the present invention is to provide a process for the polishing of plate glass which requires a smaller concentration of active ingredients, namely hydrofluoric acid and fluoride or acidic fluoride salts, than the processes known in the art, and consequently which is much more economical than the processes known in the art.

Another object is to provide a process which is easily controllable, and which produces uniform results over the entire surface of the plate glass.

Another object is to provide a process which is equally successful with every type of glass, and which functions with high polishing speed, suitable for large scale manufacturing purposes.

These and other objects of this invention will be apparent from the following description.

The crux of the present invention resides in a totally different approach, that is, in the finding that superior results may be achieved if a chemical solution is used which is weak enough to cause only incomplete polishing, and which forms reaction products insoluble in the solution itself, so that the reaction products are deposited upon the surface of the glass to protect the undersurface layer from undue drilling. In a second step, mechanical means are used to rub the surface and to remove the reaction products from the surface of the glass. Where pits are present in the glass, the reaction products are removed from the peaks on the glass surface, during the rubbing step, but are not removed from the bottom of the pits. Thus a layer of the reaction products remains to protect the bottom of the pits from further corrosion, while the peaks are removed. By repeating these two steps, treatment with the polishing solution and the rubbing step, consecutively, the plate glass is polished uniformly, rapidly and without excessive corrosion.

Thus, in summary, one feature of the present invention resides in the use of a solution which is weaker than other polishing solutions known in the art. Another feature resides in obtaining the reaction products in the form of a fine crystalline or colloidal continuous layer, insoluble in the polishing solution. Another feature resides in the removal of the reaction products and small glass particles during the rubbing step, mainly from the peaks, without disturbing the pits in the glass, which remain protected by the deposit of the reaction products, so that the level of the glass surface is lowered to the level of the bottom of the pits.

The chemical solution, in accordance with the instant invention, broadly comprises fluoride ion, and hydrogen ion, in molar ratio H/F between 0.5 and 0.7, in an aqueous solution, and with an organic solvent which decreases the surface tension and viscosity of the solution. The decrease of surface tension and viscosity, surprisingly, is very advantageous, because it decreases the solubility of the reaction products, and allows the solution to spread evenly and homogeneously over the glass surface. Another advantage is that the reaction products deposit as a fine crystalline layer, or as a colloidal layer.

More specifically, the polishing solution comprises a water-soluble fluoride or bifluoride salt, such as sodium, potassium or ammonium salts. For instance: Potassium fluoride (KF), bifluoride ($KHF_2$), ammonium fluoride ($NH_4F$), ammonium bifluoride ($NH_4HF_2$), or mixtures of these salts may be used. Within the scope of the invention, the total content of fluoride or bifluoride salts in the composition, ranges between 15 and 40% by weight, with the potassium bifluoride concentration ranging between 0 and 30% and with the ammonium bifluoride concentration ranging between 0 and 35%. The composition also comprises hydrogen ion, which may derive from the bifluoride salt, for instance ammonium bifluoride or potassium bifluoride or hydrofluoric acid, or a mixture of both, the only limitation being that the ratio of the total hydrogen concentration in moles to the total fluoride ion concentration in moles is between 0.5 and 0.7.

Manifestly, if potassium bifluoride ($KHF_2$) or ammonium bifluoride ($NH_4HF_2$) is used, or a mixture of them, without any fluoride salt, the molar ratio of hydrogen to fluoride ion is 0.5. Under these conditions, no additional hydrogen is necessary, although some hydrogen fluoride may still be added, provided that the molar ratio H/F does not exceed 0.7.

If fluoride instead of bifluoride salts are used, for instance potassium fluoride (KF) or ammonium fluoride ($NH_4F$), then it is necessary to use at least equal molar amount of hydrofluoric acid (HF), in order to provide a ratio of H/F at least 0.5.

As already mentioned above, the polishing composition, within the scope of the invention, comprises an organic solvent which is completely miscible with water, and which decreases the water solubility of the substances being formed when the polishing solution acts on glass. Suitable organic solvents are alcohols containing up to three carbon atoms and ketones up to four carbon atoms. Thus methanol, ethanol, isopropyl alcohol, n-propyl alcohol, acetone and methyl ethyl ketone or mixtures of two or more of them may be used. The total amount of the organic solvent, in the composition, is between 3 and 20% by weight. When methyl alcohol is used, the total concentration ranges between 0 and 20%. The permissible range, with ethyl alcohol, is between 0 and 10%, with acetone, between 0 and 10%, with isopropyl alcohol, between 0 and 10%, with methyl ethyl ketone, between 0 and 5%. The remainder of the composition is water.

As already mentioned above, several advantages result from the polishing compostion in the proportion as described above. The composition spreads all over the glass surface uniformly, because of its low viscosity, low surface tension and high diffusibility. Further, because of the presence of the organic material, the polishing solution has little solubilizing action for the products of the reaction of the polishing solution with glass, namely potassium or ammonium or sodium silicofluoride or a mixture of these salts. Thus the reaction products form an even, uniform thin protective layer over the entire glass surface, and prevent the polishing solution from unduly attacking the glass.

Another advantage resulting from the polishing solution in accordance with the instant invention is that the concentration of the salts in the aqueous solution is low, far less than the saturation point, and no heating is required during use. For instance, a very satisfactory solution within the scope of the invention comprises 24.4% by weight of potassium bifluoride ($KHF_2$), 6.2% hydrofluoric acid, 8.4% methanol and 61.0% water. This soltuion is far less concentrated than the saturation point and the salts have no tendency to precipitate.

The process of preparation of the solution is very simple. According to one embodiment, the ammonium fluoride, for instance 25 kg., is dissolved in 53 kg. of hot water, cooled to room temperature, then added to 6 kg. of 46% hydrofluoric acid and 16 kg. of methanol.

Manifestly, the solution in accordance with the process of this invention, is far more dilute, less effective as the active polishing composition, and by itself insufficient to cause complete and satisfactory polishing. However, in connection with the wiping mechanism which is applied in a second step, as described more fully hereinafter, and by repeating the two steps consecutively, very satisfactory results are obtained.

The invention will now be described more fully, by reference to the accompanying drawings, in which FIG. 1 is a sectional view of the apparatus for polishing a plate glass and FIGS. 2 to 6 inclusive, show magnifications of a cross section of plate glass at each of the consecutive phases of the polishing process.

With reference to FIG. 1, the glass plate 1 is laid in the plaster of Paris or equivalent bed 3, on a table 2, which is capable of moving from right to left. A frame 4 is located above the glass, and the polishing tool 5 is mounted thereon. The polishing tool is made of a material capable of retaining its shape so that it is not deformed to any great extent when it is moved along the glass surface and yet which displays high permeability for the polishing solution. A suitable material is felt or a vinyl resin of high flexibility. The frame 4 is arranged to reciprocate in the direction normal to the plane of the paper. The polishing solution is fed at a point A between the glass and the polishing tool. The force exerted by the polishing tool upon the glass surface is about 450 g. per square centimeter.

For the purpose of determining the effectiveness of the process of the invention, and the effect of adding the organic solvent, several experiments have been conducted with different proportions of fluoride salt, hydrofluoric acid and of organic solvent. The plate glass used in the experiment has surface roughness Hn, according to the Japanese Industrial Standards of 2 microns measured by the surface roughness measuring instrument of the feeler type. The overall polishing time was ten minutes in each of the experiments. The results are shown in Table 1 below.

TABLE 1

| Exp. No. | KF, percent | $KHF_2$, percent | $NH_4F$, percent | HF, percent | Alcohol, percent | Ketone, percent | Water, percent | Others, percent | Taken-off glass in thickness μ/min. | Condition of glass surface |
|---|---|---|---|---|---|---|---|---|---|---|
| 1 | | 23 | | | | | 77 | | 1.8 | Glass surface is not finished. Pits remain on it. |
| 2 | | 28 | | | 5 $CH_3OH$ | | 67 | | 1.4 | Glass surface is finished. |
| 3 | | 27 | | | 8 $CH_3OH$ | | 65 | | 1.2 | Do. |
| 4 | | 28 | | | 17 $CH_3OH$ | | 55 | | 0.9 | Do. |
| 5 | | 26 | | | 25 $CH_3OH$ | | 49 | | 0.7 | Do. |
| 6 | | 27 | | 3.5 | 8 $CH_3OH$ | | 61.5 | | 1.9 | Do. |
| 7 | | 28 | | 6 | 8 $CH_3OH$ | | 58 | | 2.6 | Do. |
| 8 | | 27 | | 9 | 8 $CH_3OH$ | | 56 | | 3.4 | Do. |
| 9 | | 27 | | 13 | 8 $CH_3OH$ | | 52 | | 4.3 | Do. |
| 10 | | 23 | | 15 | 7 $CH_3OH$ | | 55 | | 4.8 | Do. |
| 11 | | 23 | | 10 | 7 $C_2H_5OH$ | | 60 | | 4.3 | Do. |
| 12 | | 23 | | 10 | 7 $C_3H_7OH$ | | 60 | | 3.8 | Faint pits remain on glass surface. |
| 13 | | 23 | | 10 | | Acetone 7 | 60 | | 4.2 | Glass surface is finished. |
| 14 | 17 | | | 28 | 7 $CH_3OH$ | | 48 | | 4.6 | Do. |
| 15 | | | 25 | | 8 $CH_3OH$ | | 67 | | 4.0 | Do. |
| 16 | | | 25 | 6 | 16 $CH_3OH$ | | 53 | | 4.2 | Do. |
| 17 | | 21 | | 9 | 6 $CH_3OH$ | | 52 | Sugar 12 | 3.9 | Do. |
| 18 | | | | | Conventional polishing with rouge only | | | | 0.2 | |

Exps. 1 and 18 in the table are control. In No. 1, no solvent is used. Exp. No. 18 represents the results with conventional rouge (iron oxide).

It may readily be seen from Exp. 1 that the addition of an organic solvent is necessary to obtain a polished surface. Satisfactory results are obtained in Exps. 2 to 11 where methanol or ethanol are used. When isopropyl alcohol is used (Exp. 12), the results are less satisfactory, because although the solution is effective in removing glass particles, pits remain on the surface. Exp. 18, with rouge (iron oxide), shows that the conventional process of polishing glass is far less effective as compared with the process and the composition in accordance with this instant invention. Comparison of Exps. 2 to 10, in which methanol is used, shows that if no hydrofluoric acid is used (Exps. 2 to 5), the surface is polished, but the amount of glass removed is small. The best results are obtained when methanol is used together with hydrofluoric acid (Exps. 6 to 10).

[(NH$_4$)$_2$SiF$_6$; K$_2$SiF$_6$]

or both, which covers the flat surface as well as the pit.

The polishing solution, in view of the presence of the organic solvent, has low surface tension, and low viscosity, so that the reaction products are deposited as a continuous homogeneous layer consisting of small crystals.

Figure 4:
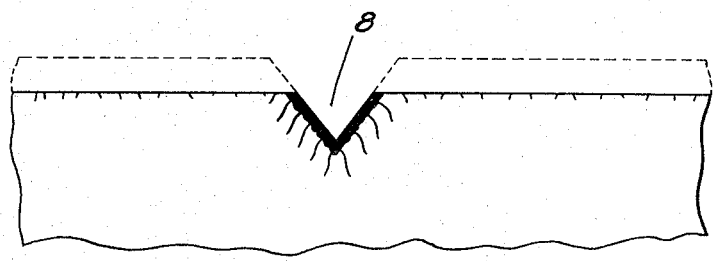

FIG. 4 shows the subsequent phase of the process, where the rubbing and wiping tool removes the layer of reaction products, from the peaks and glass surface, but leaves the pit 8, with its coating of reaction products, undisturbed.

Figure 1:
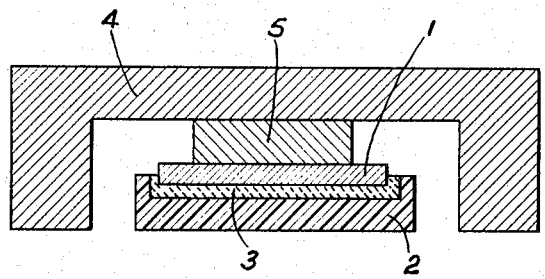
Figure 2:
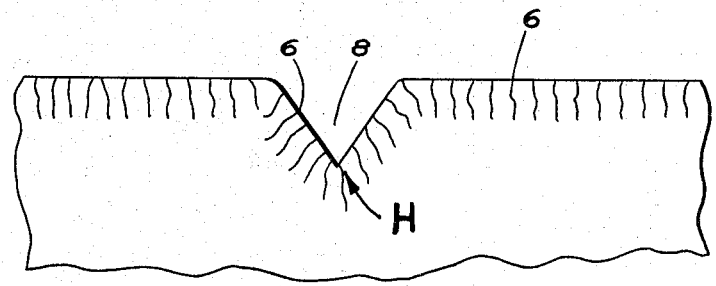
FIG. 2 shows the effect of application of the polishing solution to the glass surface, which contains one pit or valley 8, in the first stage of the process. The surface of the glass is attacked to a depth H, with the fluoride ion and acidic hydrogen reacting with the silica of the glass.
Figure 3:
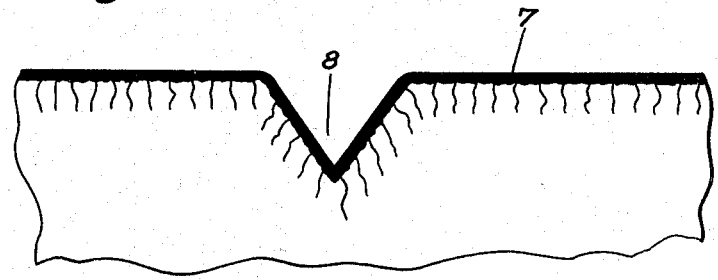
FIG. 3 shows the continuous layer 7 of insoluble products, potassium or ammonium silicofluoride
Figure 5:
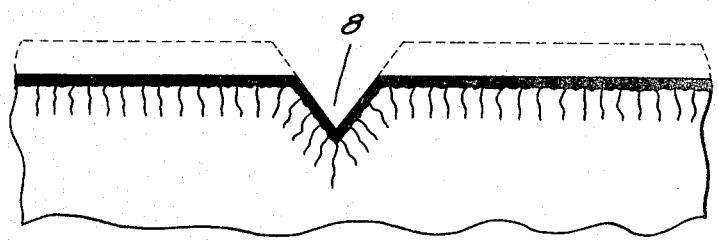
Figure 6:
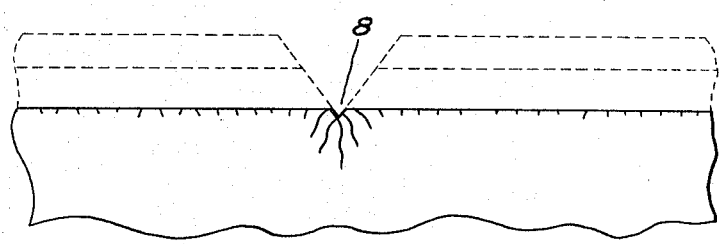

FIG. 5 shows the formation of a new layer of insoluble reaction products over the surface of the glass. Comparison of the depth of the pit 8 in FIG. 5 with the depth of the pit in FIG. 3, indicates that the level of the glass surface has been lowered by corrosion, and that the pit is less deep in FIG. 5 than in FIG. 3. The dotted lines in FIGS. 4, 5 and 6 indicate the level of the original glass surface. FIG. 6 shows that after repeating the two consecutive steps of application of the polishing solution and wiping and rubbing with the polishing tool, the level of the glass is essentially lowered to the level of the original pit. The ultimate result is that the plate glass is obtained essentially without peaks or pits, smooth and with uniform finish.

In accordance with one embodiment of the invention, and depending upon the particular type of glass being used, it may be necessary, in some instances, to add some substances which increase the surface tension and viscosity of the polishing solution, still retaining, however, the organic solvents as mentioned above. The substance which increases the viscosity of the solution may be phosphoric acid, sugar or a polymeric material. Exp. 17 in Table 1 shows the effect of adding a small amount of sugar to the polishing solution. The total amount of these additives which increase the viscosity and surface tension of the solution, should not exceed 12% by weight of the solution.

According to another embodiment of the invention, a small amount of abrasives may be added, in the proportion of 3 to 4% by weight of the total polishing solution. Suitable abrasives are chromium oxide, iron oxide, cerium oxide and tin oxide. The abrasives are preferably added to the polishing solution just before use.

It is manifest from the above that this invention represents a substantial contribution in the art of polishing glass, because, by the combination of the chemical reaction and the mechanical rubbing step, superior results are obtained, in a very short time and by the use of a solution which is more dilute in active ingredients than other polishing solutions used in the art, and consequently less expensive. Those skilled in the art will readily visualize that several variations of the invention as described in the example are possible, without departing from the spirit of the invention, which is to be limited only by the scope of the appended claims.

What is claimed is:

1. The process of polishing irregular pit and peak-containing plate glass surfaces which comprises the steps of:
    (1) locating said glass plate beneath and in wiping and rubbing engagement with a wiping tool having a flat working surface parallel to said glass surface;
    (2) flooding the surface of the glass with an aqueous solution consisting essentially of a salt which is a member selected from the group consisting of potassium fluoride, ammonium fluoride, ammonium bifluoride, potassium bifluoride, in the total proportion between 15 and 40% by weight, hydrofluoric acid in the proportion between 0 and 16% by weight, said solution containing the constituents of hydrofluoric acid, acidic hydrogen and fluoride ion, in the molar ratio H/F between 0.5 and 0.7, and an organic solvent which is a member selected from the group consisting of methanol in the proportion between 0 and 20% by weight, ethanol in the proportion between 0 and 10% by weight, acetone in the proportion between 0 and 10% by weight, isopropyl alcohol in the proportion between 0 and 10% by weight, methyl ethyl ketone in the proportion between 0 and 5% by weight, and mixtures of methanol, ethanol, isopropyl, alcohol, acetone, methyl ethyl ketone, in the total proportion between 3 and 20% by weight, the remainder being water, to cause said solution to react chemically with the surface of said glass whereby a continuous layer of water-insoluble reaction products is deposited over the surface of the glass and pits thereon;
    (3) simultaneously moving both said plate and said wiping tool to remove said layer of reaction products from the surface of the glass, while leaving the surface of said pits undisturbed; and
    (4) repeating said two consecutive steps of flooding the glass with the polishing solution and rubbing with the wiping tool until the level of the glass surface is lowered to the level of the bottom of said pits and the peaks are removed and a finished surface is obtained.

2. The process according to claim 1, wherein said wiping tool has an abrasive and rubbing action.

3. The process according to claim 1, wherein said wiping tool is made of a vinyl resin, of high permeability for said polishing solution, or of felt.

References Cited by the Examiner
UNITED STATES PATENTS

| | | | |
|---|---|---|---|
| 1,777,321 | 10/1930 | Meth | 252—79.3 |
| 2,278,257 | 3/1942 | Gallagher | 252—79.3 |
| 2,558,013 | 6/1951 | Staubly | 252—143 |
| 2,936,554 | 5/1960 | Junge | 51—283 |
| 3,061,494 | 10/1962 | Synder | 252—79.3 X |
| 3,097,083 | 7/1963 | Silvernail | 51—307 |

LEON D. ROSDOL, *Primary Examiner.*

JULIUS GREENWALD, SAMUEL H. BLECH,
*Examiners.*

M. WEINBLATT, *Assistant Examiner.*